US012625252B2

(12) United States Patent
Hyun et al.

(10) Patent No.: US 12,625,252 B2
(45) Date of Patent: May 12, 2026

(54) CALCULATING THE POSITION OF A MEASUREMENT TARGET USING MULTIPLE MEASURING DEVICES

(71) Applicant: Samsung Electronics Co., Ltd., Suwon-si (KR)

(72) Inventors: Seong-Hwan Hyun, Seoul (KR); Seong-Cheol Kim, Seoul (KR); Jihye Kim, Seoul (KR)

(73) Assignees: Samsung Electronics Co., Ltd., Gyeonggi-do (KR); Seoul National University R&DB Foundation, Seoul (KR)

( * ) Notice: Subject to any disclaimer, the term of this patent is extended or adjusted under 35 U.S.C. 154(b) by 199 days.

(21) Appl. No.: 18/348,862

(22) Filed: Jul. 7, 2023

(65) Prior Publication Data
US 2024/0019567 A1     Jan. 18, 2024

(30) Foreign Application Priority Data
Jul. 12, 2022     (KR) ........................ 10-2022-0085880

(51) Int. Cl.
*G01S 13/87*          (2006.01)
*G01S 13/06*          (2006.01)
(Continued)

(52) U.S. Cl.
CPC .............. *G01S 13/87* (2013.01); *G01S 13/06* (2013.01); *G01S 13/582* (2013.01); (Continued)

(58) Field of Classification Search
CPC ........ G01S 13/87; G01S 13/06; G01S 13/582; G01S 13/584; G01S 13/878; G01S 13/92; G01S 2013/468
See application file for complete search history.

(56) References Cited

U.S. PATENT DOCUMENTS

| | | | | |
|---|---|---|---|---|
| 4,106,023 A | * | 8/1978 | Baghdady | G01S 13/42 342/405 |
| 5,528,246 A | * | 6/1996 | Henderson | G01S 7/415 342/115 |

(Continued)

FOREIGN PATENT DOCUMENTS

| | | |
|---|---|---|
| KR | 10-2195935 B1 | 12/2020 |
| KR | 10-2321422 B1 | 11/2021 |
| WO | WO-2020/095819 A1 | 5/2020 |

OTHER PUBLICATIONS

Extended European Search Report dated Dec. 19, 2023 for corresponding European Application No. 23184721.1.

(Continued)

*Primary Examiner* — Justin R. Blaufeld
(74) *Attorney, Agent, or Firm* — Harness, Dickey & Pierce, P.L.C.

(57) ABSTRACT
An operating method of a server for calculating a position of a measurement target includes receiving first measurement information including a result of measuring the measurement target by a first electronic device, receiving second measurement information including a result of measuring the measurement target by a second electronic device, and calculating the position of the measurement target based on the first measurement information and the second measurement information.

17 Claims, 11 Drawing Sheets

(51) Int. Cl.

| | |
|---|---|
| *G01S 13/46* | (2006.01) |
| *G01S 13/58* | (2006.01) |
| *G01S 13/92* | (2006.01) |

(52) U.S. Cl.
CPC .......... *G01S 13/584* (2013.01); *G01S 13/878* (2013.01); *G01S 13/92* (2013.01); *G01S 2013/468* (2013.01)

(56) References Cited

U.S. PATENT DOCUMENTS

| | | | | |
|---|---|---|---|---|
| 6,261,233 | B1 * | 7/2001 | Kantorovich | ............ A61B 8/06 |
| | | | | 600/454 |
| 6,982,668 | B1 * | 1/2006 | Doerry | ................ G01S 13/5242 |
| | | | | 342/162 |
| 10,096,244 | B2 | 10/2018 | Ho et al. | |
| 10,754,003 | B2 | 8/2020 | Kang et al. | |
| 2002/0060640 | A1 * | 5/2002 | Davis | ..................... G08G 1/056 |
| | | | | 340/936 |
| 2003/0083578 | A1 * | 5/2003 | Abe | ........................ A61B 8/485 |
| | | | | 600/443 |
| 2005/0095989 | A1 * | 5/2005 | Brouwer | ................. G01S 11/06 |
| | | | | 455/69 |
| 2012/0303278 | A1 * | 11/2012 | Dannevik | ............... G01W 1/00 |
| | | | | 702/3 |
| 2017/0067991 | A1 * | 3/2017 | Liu | ......................... G01S 13/87 |
| 2017/0277960 | A1 * | 9/2017 | Ramasamy | .......... G06V 20/588 |

| | | | | |
|---|---|---|---|---|
| 2018/0088221 | A1 * | 3/2018 | Yomo | ..................... G01S 7/003 |
| 2019/0154439 | A1 | 5/2019 | Binder | |
| 2019/0391250 | A1 * | 12/2019 | Cohen | ..................... G01S 13/87 |
| 2020/0003885 | A1 * | 1/2020 | Choi | ........................ G01S 13/64 |
| 2020/0033147 | A1 | 1/2020 | Ahn | |
| 2020/0301003 | A1 * | 9/2020 | Furuta | ................... G01S 13/931 |
| 2021/0009161 | A1 | 1/2021 | Kim et al. | |
| 2021/0018588 | A1 * | 1/2021 | Akamine | ................ G01S 7/411 |
| 2021/0055399 | A1 * | 2/2021 | Hiramoto | ............... G01S 13/06 |
| 2021/0235342 | A1 * | 7/2021 | Zhu | ........................ H04W 76/27 |
| 2021/0256728 | A1 * | 8/2021 | Ikeda | ........................ G06T 7/70 |
| 2021/0270614 | A1 | 9/2021 | Mousain et al. | |
| 2021/0360571 | A1 | 11/2021 | Hwang et al. | |
| 2022/0058943 | A1 | 2/2022 | Jeong et al. | |
| 2022/0119038 | A1 * | 4/2022 | Ham | ................... B62D 15/028 |
| 2023/0094836 | A1 * | 3/2023 | Kellner | ................ G01S 13/426 |
| | | | | 342/52 |

OTHER PUBLICATIONS

Hakobyan, Gor, and Bin Yang, "A novel intercarrier-interference free signal processing scheme for OFDM radar." IEEE Transactions on Vehicular Technology, vol. 67, No. 6, pp. 5158-5167, Jun. 2018.
Hyun, Seong-Hwan, et al., "Adaptive beam design for V2I communications using vehicle tracking with extended Kalman filter," IEEE Transactions on Vehicular Technology, vol. 71, No. 1, pp. 489-502, Jan. 2022.

* cited by examiner

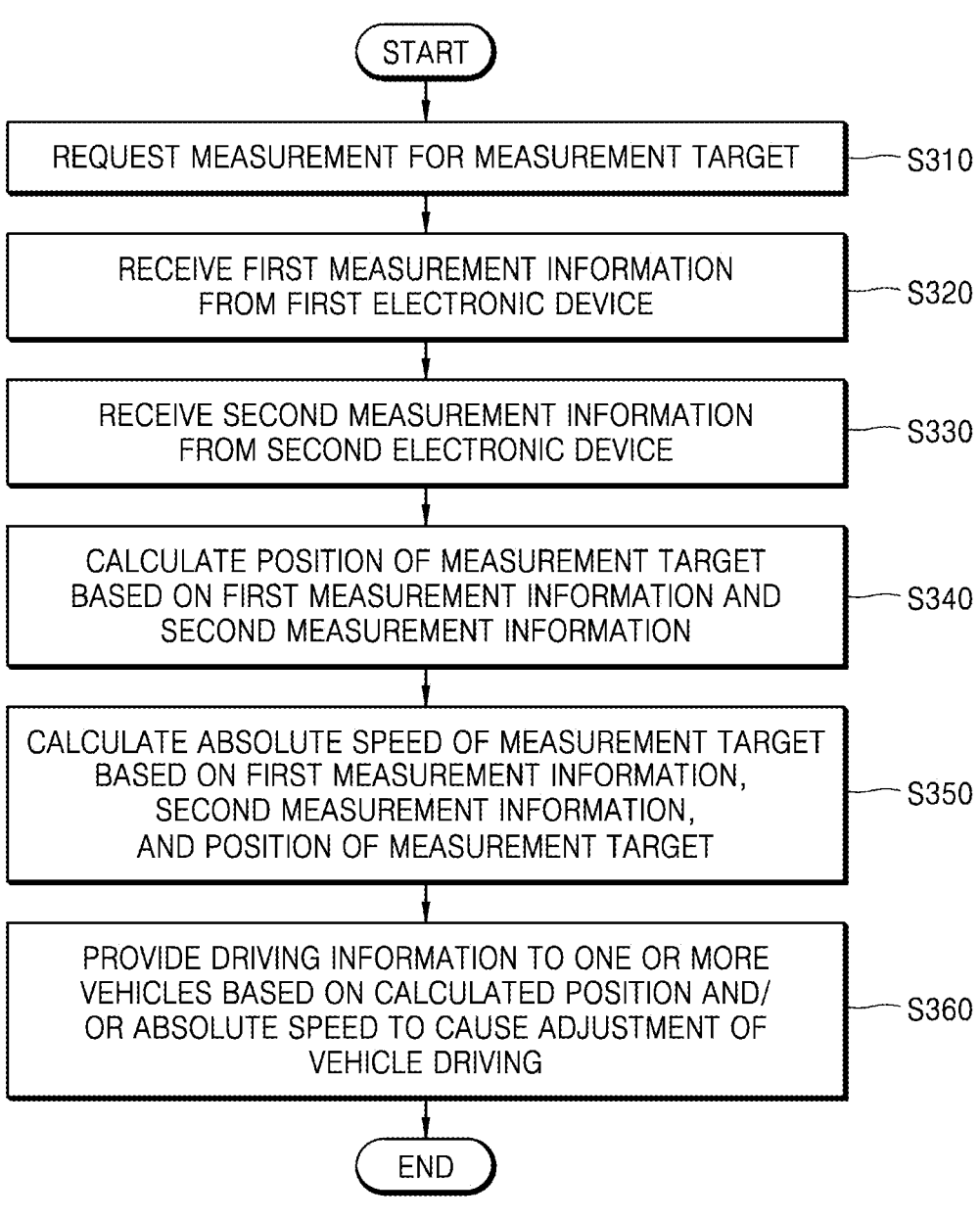

START

REQUEST MEASUREMENT FOR MEASUREMENT TARGET —— S310

RECEIVE FIRST MEASUREMENT INFORMATION
FROM FIRST ELECTRONIC DEVICE —— S320

RECEIVE SECOND MEASUREMENT INFORMATION
FROM SECOND ELECTRONIC DEVICE —— S330

CALCULATE POSITION OF MEASUREMENT TARGET
BASED ON FIRST MEASUREMENT INFORMATION AND
SECOND MEASUREMENT INFORMATION —— S340

CALCULATE ABSOLUTE SPEED OF MEASUREMENT TARGET
BASED ON FIRST MEASUREMENT INFORMATION,
SECOND MEASUREMENT INFORMATION,
AND POSITION OF MEASUREMENT TARGET —— S350

PROVIDE DRIVING INFORMATION TO ONE OR MORE
VEHICLES BASED ON CALCULATED POSITION AND/
OR ABSOLUTE SPEED TO CAUSE ADJUSTMENT OF
VEHICLE DRIVING —— S360

END

FIG. 6

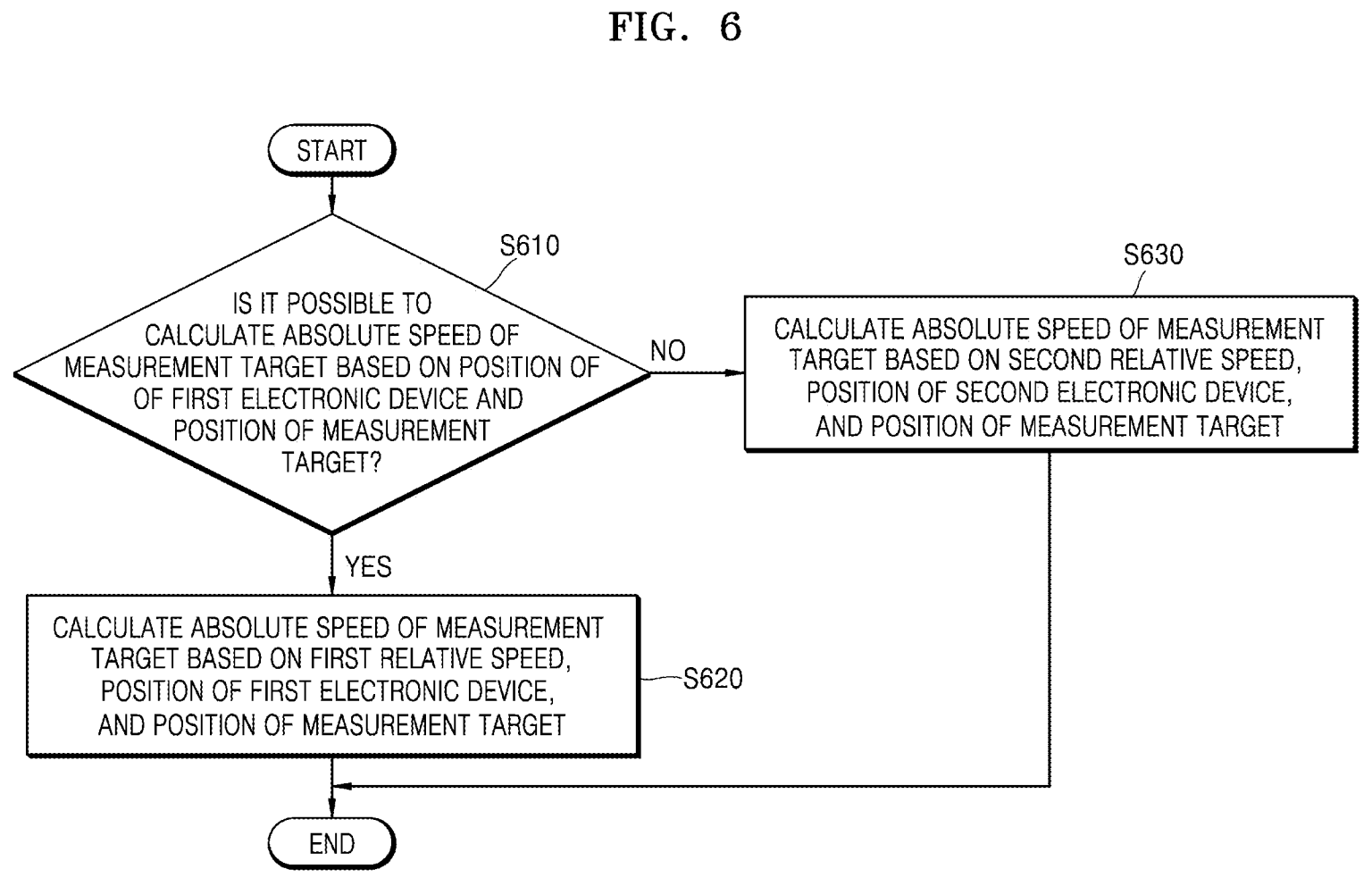

START

S610
IS IT POSSIBLE TO CALCULATE ABSOLUTE SPEED OF MEASUREMENT TARGET BASED ON POSITION OF FIRST ELECTRONIC DEVICE AND POSITION OF MEASUREMENT TARGET?

NO

S630
CALCULATE ABSOLUTE SPEED OF MEASUREMENT TARGET BASED ON SECOND RELATIVE SPEED, POSITION OF SECOND ELECTRONIC DEVICE, AND POSITION OF MEASUREMENT TARGET

YES

S620
CALCULATE ABSOLUTE SPEED OF MEASUREMENT TARGET BASED ON FIRST RELATIVE SPEED, POSITION OF FIRST ELECTRONIC DEVICE, AND POSITION OF MEASUREMENT TARGET

END

CALCULATING THE POSITION OF A MEASUREMENT TARGET USING MULTIPLE MEASURING DEVICES

CROSS-REFERENCE TO RELATED APPLICATION

This application is based on and claims priority under 35 U.S.C. § 119 to Korean Patent Application No. 10-2022-0085880, filed on Jul. 12, 2022 in the Korean Intellectual Property Office, the disclosure of which is incorporated by reference herein in its entirety.

BACKGROUND

The inventive concepts relate to operating methods of servers, and more particularly, to operating methods of servers, which calculate a position of a measurement target, based on a measured result of the measurement target based on using a first electronic device and a second electronic device.

As interest in autonomous driving increases, interest in technologies that enable autonomous driving is increasing. For autonomous driving, it is necessary to develop a technology for recognizing the external environment of a vehicle, and a technology for adjusting an operation, such as acceleration, stop, and rotation of the vehicle, and for adjusting a driving path based on recognized information. Among the technologies, a technology for recognizing the external environment of the vehicle is considered important because the technology becomes the basis for the autonomous driving.

SUMMARY

Some example embodiments of the inventive concepts provide an operating method of a server capable of calculating a position and speed of a vehicle on the road.

According to some example embodiments of the inventive concepts, an operating method of a server to calculate a position of a measurement target may include receiving first measurement information including a result of measuring the measurement target by a first electronic device, receiving second measurement information including a result of measuring the measurement target by a second electronic device, and calculating the position of the measurement target based on the first measurement information and the second measurement information. Such a method may enable accurate measurement of the position and speed of vehicles on the road, and which may enable the speed of the vehicle in autonomous driving, the spacing with the adjacent vehicles, or the like to be adjusted more quickly and/or with greater accuracy, with reduced consumption of computing resources, with reduced consumption of electrical power, or the like.

According to some example embodiments of the inventive concepts, a server may include a communication circuit configured to communicate with a first electronic device and a second electronic device, a processor configured to execute one or more instructions, and a memory configured to store the one or more instructions, wherein the communication circuit may be configured to transmit a measurement request for a measurement target to the first electronic device and the second electronic device, receive first measurement information including a result of measuring the measurement target by the first electronic device, and receive second measurement information including a result of measuring the measurement target by the second electronic device, and wherein the processor may be configured to execute the one or more instructions to calculate a position of the measurement target based on the first measurement information and the second measurement information.

According to some example embodiments of the inventive concepts, a system for calculating a position of a measurement target may include a first electronic device configured to measure a first distance, which is a distance between the first electronic device and the measurement target, and a first relative speed, which is a relative speed of the measurement target with respect to the first electronic device, the first electronic device configured to generate first measurement information including the first distance and the first relative speed, a second electronic device configured to measure a second distance, which is a distance between the second electronic device and the measurement target, and a second relative speed, which is a relative speed of the measurement target with respect to the second electronic device, the second electronic device configured to generate second measurement information including the second distance and the second relative speed, and a server configured to receive the first measurement information and the second measurement information, the server configured to calculate a position of the measurement target and an absolute speed of the measurement target based on the first measurement information and the second measurement information.

BRIEF DESCRIPTION OF THE DRAWINGS

Some example embodiments will be more clearly understood from the following detailed description taken in conjunction with the accompanying drawings in which:

FIG. 2 is a block diagram of a configuration of a system and a server included in the system, according to some example embodiments;

FIG. 3 is a flowchart of an operating method of a server, according to some example embodiments;

FIG. 6 is a flowchart of an example of a method of calculating an absolute speed of a measurement target by a server, according to some example embodiments;

DETAILED DESCRIPTION

Figure 1:
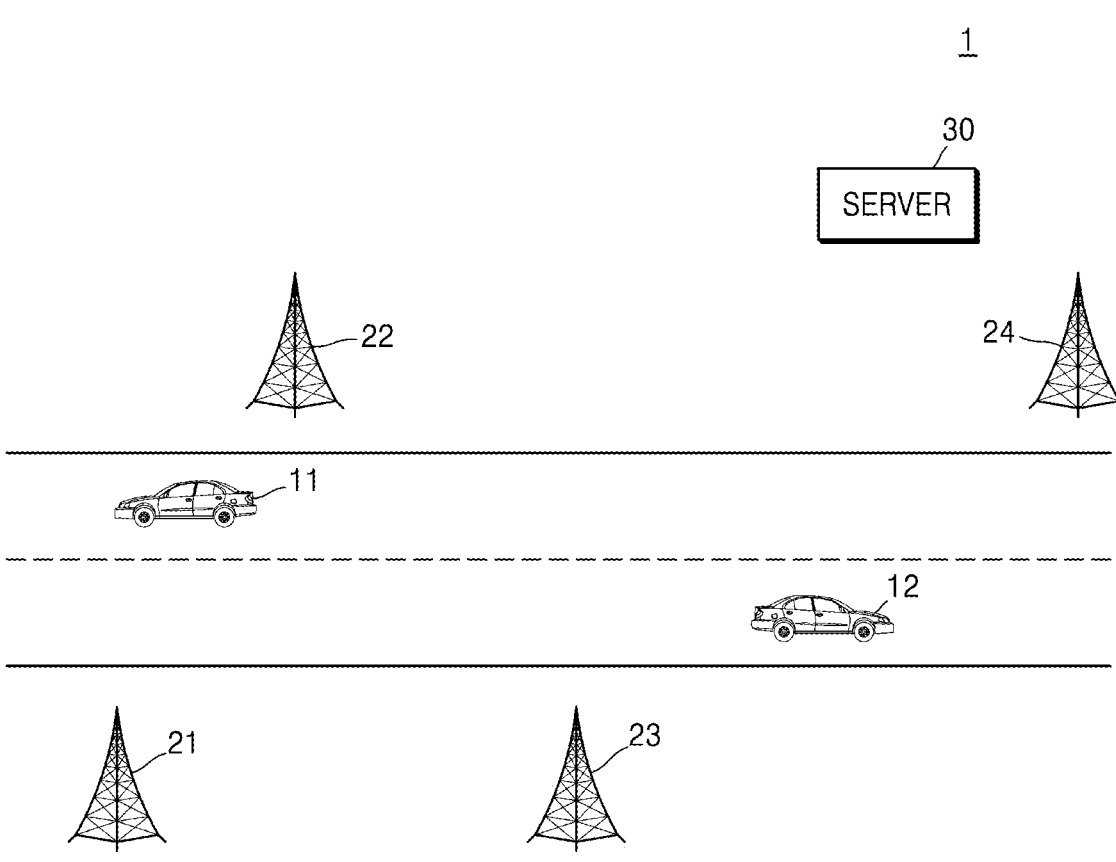
FIG. 1 is a diagram of a system according to some example embodiments.

Hereinafter, some example embodiments of the inventive concepts will be described in detail with reference to the accompanying drawings. In this specification, terms indicating an order such as first, and second, are used to distinguish components having the same/similar functions as/to each other, and the first and second may be changed depending on an order in which they are mentioned.

It will be understood that when an element is referred to as being "on" another element, it may be directly on the other element or intervening elements may also be present. In contrast, when an element is referred to as being "directly on" another element, there are no intervening elements present. It will further be understood that when an element is referred to as being "on" another element, it may be above or beneath or adjacent (e.g., horizontally adjacent) to the other element.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%)).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

As described herein, an element that is described to be "spaced apart" from another element, in general and/or in a particular direction (e.g., vertically spaced apart, laterally spaced apart, etc.) and/or described to be "separated from" the other element, may be understood to be isolated from direct contact with the other element, in general and/or in the particular direction (e.g., isolated from direct contact with the other element in a vertical direction, isolated from direct contact with the other element in a lateral or horizontal direction, etc.). Similarly, elements that are described to be "spaced apart" from each other, in general and/or in a particular direction (e.g., vertically spaced apart, laterally spaced apart, etc.) and/or are described to be "separated" from each other, may be understood to be isolated from direct contact with each other, in general and/or in the particular direction (e.g., isolated from direct contact with each other in a vertical direction, isolated from direct contact with each other in a lateral or horizontal direction, etc.). Similarly, a structure described herein to be between two other structures to separate the two other structures from each other may be understood to be configured to isolate the two other structures from direct contact with each other.

FIG. 1 is a diagram of a system 1, according to some example embodiments.

Referring to FIG. 1, the system 1 for calculating a position of a measurement target according to some example embodiments may be a system, in which a vehicle to infrastructure (V2I) communication, which is wireless communication between a vehicle and an infrastructure, is performed. The system 1 according to some example embodiments may include measurement targets 11 and 12, roadside base stations 21, 22, 23, and 24, and a server 30.

The measurement targets 11 and 12 may be targets to be measured for positions and absolute speeds thereof in the system 1. The measurement targets 11 and 12 may include moving tools, which are each configured move along a road, and in some example embodiments, the measurement targets 11 and 12 may include separate, respective vehicles. It will be understood that any measurement target as described herein may be a vehicle, which may include a vehicle including (and configured to implement) an Advanced Driver Assistance System (ADAS) and/or may be an autonomous vehicle. FIG. 1 illustrates some example embodiments, in which there are two of the measurement targets 11 and 12 in the system 1, but in some example embodiments, unlike the example embodiments shown in FIG. 1, there may be one or more of the measurement targets 11 and 12 in the system 1.

The roadside base stations 21, 22, 23, and 24 may communicate (e.g., may be communicatively coupled) with one or more of the measurement targets 11 and 12. The roadside base stations 21, 22, 23, and 24 may communicate with the measurement targets 11 and 12 by using the V2I communication. The roadside base stations 21, 22, 23, and 24 may transmit a transmission signal to the measurement targets 11 and 12 by using orthogonal frequency division multiplexing (OFDM). In addition, the roadside base stations 21, 22, 23, and 24 may receive a reflection signal generated by reflecting the transmission signal by the measurement targets 11 and 12 by using OFDM radars.

The roadside base stations 21, 22, 23, and 24 may measure the distance between the roadside base stations 21, 22, 23, and 24 and the measurement targets 11 and 12, and the relative speed of the measurement targets 11 and 12 based on the transmission signal and the reflection signal.

The roadside base stations 21, 22, 23, and 24 may be around (e.g., located proximate to) the road. The roadside base stations 21, 22, 23, and 24 may be arranged (e.g., configured) to estimate the position and the absolute speed of the measurement targets 11 and 12 in the system 1. Although FIG. 1 illustrates some example embodiments, in which four of the roadside base stations 21, 22, 23, and 24 are arranged in the system 1, two or more of the roadside base stations 21, 22, 23, and 24 may be arranged in the system 1.

Figure 11:
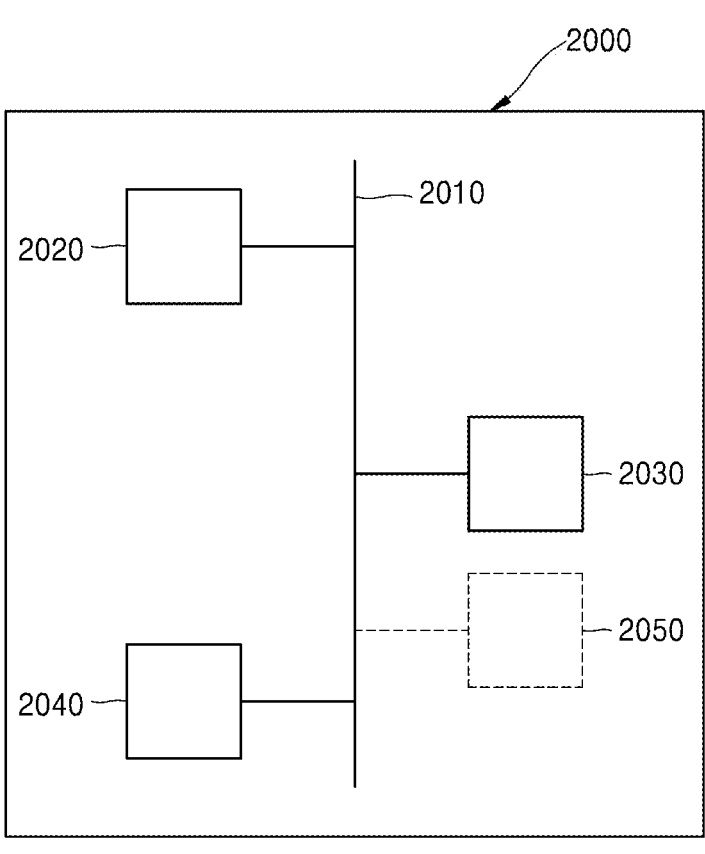
FIG. 11 is a block diagram of an electronic device according to some example embodiments.

Components included in the roadside base stations 21, 22, 23, and 24 and operations of the roadside base stations 21, 22, 23, and 24 may be implemented and performed, respectively, by using an electronic device installed in the roadside base stations 21, 22, 23, and 24, for example an electronic device 2000 as shown in FIG. 11.

The server 30 may communicate with (e.g., may be communicatively coupled with) the roadside base stations 21, 22, 23, and 24. The server 30 may receive measurement information from the roadside base stations 21, 22, 23, and 24. The measurement information may include (e.g., may indicate, may be processed at the server 30 to enable the server 30 to determine, etc.) a distance between the roadside base stations 21, 22, 23, and 24 and the measurement targets 11 and 12, measured by the roadside base stations 21, 22, 23, and 24, and a relative speed of the measurement targets 11 and 12 with respect to the roadside base stations 21, 22, 23, and 24.

The server 30 may perform calculation, based on measurement information received from the roadside base stations 21, 22, 23, and 24. The server 30 may calculate the position and the absolute speed of the measurement targets 11 and 12 based on the measurement information.

In some example embodiments, the server 30 may include an autonomous driving server, which provides driving information to the measurement targets 11 and 12, based on the measurement information and the calculated location and absolute speed of the measurement targets 11 and 12. Such driving information may be used by portions of the measurement targets 11 and/or 12 to adjust navigation (e.g., driving) of the measurement targets 11 and/or 12 though the external environment. For example, the measurement targets 11 and/or 12 may be vehicles that each include an Advanced Driver Assistance System (ADAS). An ADAS in a vehicle may be configured to implement autonomous driving of the vehicle (e.g., based on controlling one or more driving control elements of the vehicle) based on receiving driving information. The driving information provided (e.g., transmitted) from the server 30 to one or more vehicles (e.g., the measurement targets 11 and/or 12) may be used by respective ADASs of the one or more vehicles to adjust navigation (e.g., driving, such as autonomous driving) of the one or more vehicles through an external environment and/or in relation to each other. Such adjusted navigation (e.g., driving) of a vehicle, which may be implemented based on the ADAS of the vehicle controlling one or more driving control elements of the vehicle, may include adjusting one or more of the speed and/or trajectory of the vehicle in autonomous driving, the spacing of the vehicle in relation to an adjacent and/or proximate separate vehicle, or the like.

Components included in the server 30 and operations of the server 30 may be implemented and performed, respectively, by using an electronic device installed in the server 30, for example an electronic device 2000 as shown in FIG. 11. Components included in the measurement targets 11 and/or 12 and operations of the measurement targets 11 and/or 12 (e.g., operation of an ADAS included in one or more of the measurement targets 11 and/or 12) may be implemented and performed, respectively, by using an electronic device installed in the measurement targets 11 and/or 12, for example an electronic device 2000 as shown in FIG. 11.

A more detailed operation of the system 1 according to some example embodiments is described with reference to FIG. 2.

Figure 2:
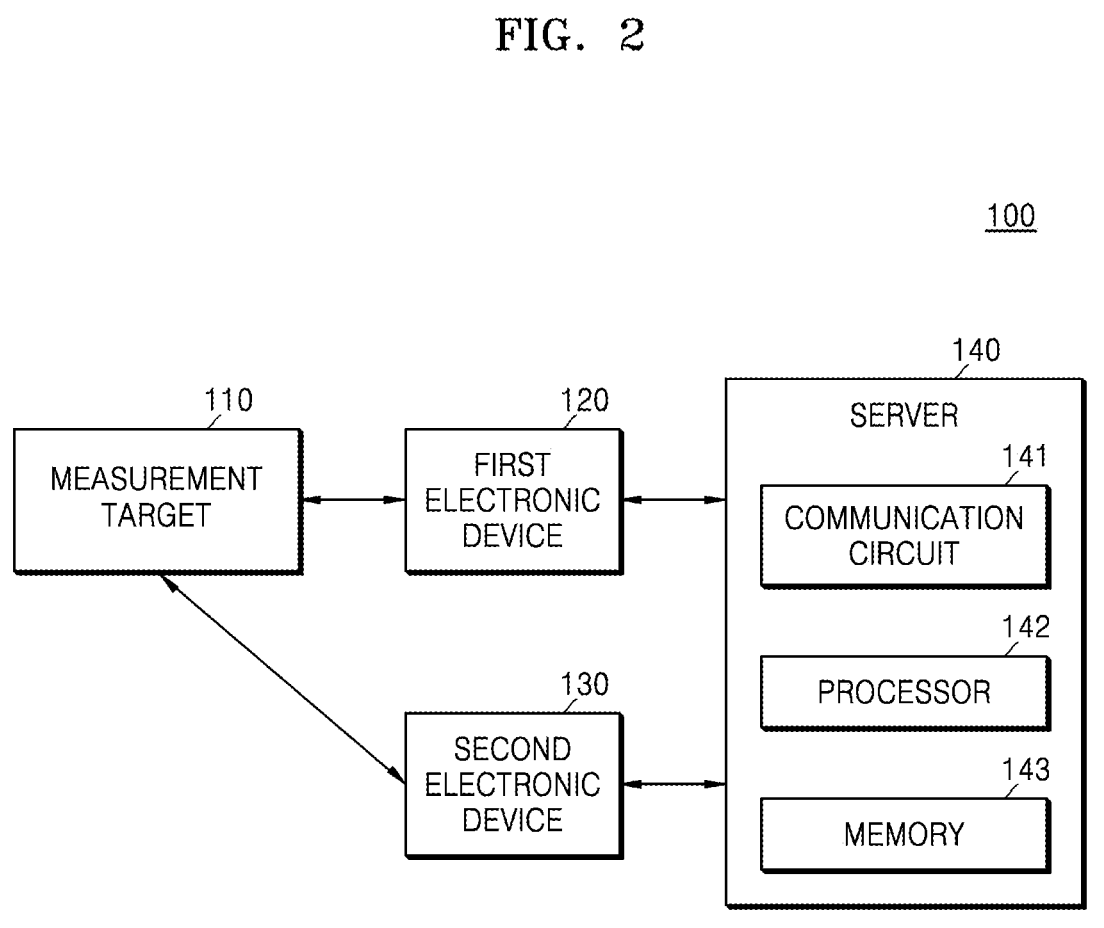

FIG. 2 is a block diagram of a configuration of a system 100 and a server 140 included in the system 100, according to some example embodiments.

Referring to FIG. 2, the system 100 according to some example embodiments may include a measurement target 110, a first electronic device 120, a second electronic device 130, and the server 140. The measurement target 110 may implement one or more of the measurement targets 11 and/or 12 shown in FIG. 1. The first electronic device 120 and the second electronic device 130 may each be included in, may include, may implement, and/or may be implemented by one or more of the roadside base states 21, 22, 23, and/or 24 shown in FIG. 1. The server 140 may be included in, may include, may implement, and/or may be implemented by the server 30 shown in FIG. 1. It will be understood that any portion of the system 100, including the measurement target 110, the first electronic device 120, the second electronic device 130, the server 140, the communication circuit 141, the processor 142, the memory 143, or any portion thereof may be implemented by an electronic device and/or any processing circuitry thereof, including for example the electronic device 2000 shown in FIG. 11 and/or any processing circuitry thereof.

The location and the absolute speed of the measurement target 110 may be measured by using the first electronic device 120, the second electronic device 130, and the server 140. In some example embodiments, the measurement target 110 may include a vehicle traveling on a road.

The first electronic device 120 may include (e.g., may be implemented by) an electronic device in a first roadside base station (e.g., roadside base station 21 shown in FIG. 1) installed in the system 100. In addition, the second electronic device 130 may include (e.g., may be implemented by) an electronic device in a second roadside base station (e.g., roadside base station 22 shown in FIG. 1) installed in the system 100. In some example embodiments, the first roadside base station and the second roadside base station may include two roadside base stations closest to the measurement target 110 among a plurality of roadside base stations installed in the system 100. For example, the first electronic device 120 and the second electronic device 130 may be located at, may be included in, may be implemented by, may implement, etc., separate, respective roadside base stations of a plurality of roadside base stations, where the separate, respective roadside base stations are a closest two roadside base stations to the measurement target 110 among the plurality of roadside base stations. For example, the first roadside base station that includes the first electronic device 120 may include a roadside base station closest to the measurement target 110 among the plurality of roadside base stations, and the second roadside base station that includes the second electronic device 130 may include a roadside base station closest to the measurement target 110, except for the first roadside base station.

The first electronic device 120 may measure a first distance, that is a distance between the first electronic device 120 and the measurement target 110. In addition, the first electronic device 120 may measure a first relative speed, that is a relative speed of the measurement target 110 with respect to the first electronic device 120. In some example embodiments, the first electronic device 120 may measure the first distance and the first relative speed, based on a first transmission signal transmitted (e.g., transmitted from the first electronic device 120) to the measurement target 110 and a first reflection signal generated by reflecting (e.g., based on reflection of) the first transmission signal by the measurement target 110 and resultant detection of the reflected first transmission signal (e.g., detection by the first electronic device 120).

The first electronic device 120 may generate first measurement information including (e.g., indicating) a result of measuring the measurement target 110 by the first electronic device 120. In some example embodiments, the first measurement information may include (e.g., may indicate) the first distance and the first relative speed. The first electronic device 120 may transmit the first measurement information to the server 140. It will be understood that the first measurement information may be received and processed to determine the first distance and the first relative speed.

The second electronic device 130 may measure a second distance, that is a distance between the second electronic device 130 and the measurement target 110. In addition, the second electronic device 130 may measure a second relative speed, that is a relative speed of the measurement target 110 with respect to the second electronic device 130. In some example embodiments, the second electronic device 130 may measure the second distance and the second relative speed, based on a second transmission signal transmitted (e.g., transmitted from the second electronic device 130) to the measurement target 110 and a second reflection signal generated by reflecting the second transmission signal by the measurement target 110 and resultant detection of the reflected first transmission signal (e.g., detection by second electronic device 130).

The second electronic device 130 may generate second measurement information including (e.g., indicating) a result of measuring the measurement target 110 by the second electronic device 130. In some example embodiments, the second measurement information may include (e.g., may indicate) the second distance and the second relative speed. The second electronic device 130 may transmit the second measurement information to the server 140. It will be understood that the second measurement information may be received and processed to determine the second distance and the second relative speed.

The server 140 may receive the first measurement information from the first electronic device 120. The server 140 may receive the second measurement information from the second electronic device 130. The server 140 may calculate the position of the measurement target 110 and the absolute speed of the measurement target 110, based on the first measurement information and the second measurement information.

The server 140 may include a communication circuit 141, a processor 142, and a memory 143.

The communication circuit 141 may support establishing a communication channel between the server 140 and an external electronic device (for example, the first electronic device 120 and the second electronic device 130) and performing communication via the established communication channel. The communication circuit 141 may include one or more communication processors, which operate independently of the processor 142 and support communication. For example, a communication circuit 141 may include a wireless communication module (for example, a cellular communication module, a short-range wireless communication module, or a global navigation satellite system (GNSS) communication module), or a wired communication module (for example, a local area network (LAN) communication module, or a power line communication module). The communication circuit 141 may communicate with an external electronic device via a first network (for example, a short-range communication network, such as Bluetooth, WiFi direct, or Infrared Data Association (IrDA)), or a second network (for example, a cellular network, Internet, or a computer network (for example, a long-range communication network, such as LAN or a wide area network (WAN)). Various types of communication modules may be implemented as one component (for example, a single chip) or multiple components (for example, multiple chips).

In some example embodiments, the communication circuit 141 may communicate with the first electronic device 120 and the second electronic device 130. The communication circuit 141 may transmit a measurement request for the measurement target 110 to both the first electronic device 120 and the second electronic device 130. The communication circuit 141 may receive, as a reply to the measurement request, the first measurement information from the first electronic device 120 and the second measurement information from the second electronic device 130.

The processor 142 may execute one or more instructions (software). The processor 142 may execute one or more instructions to control other components (for example, hardware or software components) included in the server 140, and may perform various data processing or operations. For example, the processor 142 may load commands or data received from other components into a volatile memory as at least a portion of data processing or operation, process commands or data stored in the volatile memory, and store the result data in a non-volatile memory. As another example, the processor 142 may include a main processor (for example, a central processing unit or application processor), and an auxiliary processor (for example, a graphics processing unit, an image signal processor, a sensor hub processor, or a communication processor), which can be operated independently or together. The auxiliary processor may be configured to use less electrical power than a main processor, or to be specialized in a designated function. The auxiliary processor may be implemented separately from or as a portion of the main processor.

In some example embodiments, the processor 142 may calculate the position of the measurement target 110 and the absolute speed of the measurement target 110, based on the first measurement information and the second measurement information.

The memory 143 may store one or more instructions. In addition, the memory 143 may store various pieces of data used by at least one component of the server 140 (for example, the processor 142). The data may include input data or output data for one or more instructions (software) and related instructions thereto. Memory 143 may include a volatile memory or a non-volatile memory. A program may be stored as software in the memory 143, and may include, for example, an operating system, middleware, or an application.

A more detailed operation of the server 140 is described with reference to FIG. 3.

FIG. 3 is a flowchart of an operating method of the server 140, according to some example embodiments.

Referring to FIG. 3, in operation S310, the communication circuit 141 may transmit a measurement request for the measurement target 110 to both the first electronic device 120 and the second electronic device 130.

The measurement request may include a request for an electronic device included in a roadside base station to measure a distance between the electronic device and the measurement target 110 and a relative speed of the measurement target 110 with respect to the electronic device, and to transmit the measurement result back to the server 140. Accordingly, upon receiving the measurement request, the first electronic device 120 may perform measurement on the measurement target 110 (e.g., transmission of a transmission signal to be reflected by the measurement target 110 and then received/detected at the first electronic device 120), generate the first measurement information based on such measurement (e.g., based on processing the transmitted and detected signals, and transmit the generated first measurement information to the server 140. In addition, upon receiving the measurement request, the second electronic device 130 may perform measurement on the measurement target 110 (e.g., transmission of a transmission signal to be reflected by the measurement target 110 and then received/detected at the second electronic device 130), generate the second measurement information based on such measurement (e.g., based on processing the transmitted and detected signals, and transmit the generated second measurement information to the server 140.

A more detailed method of measuring the measurement target by the first electronic device 120 and the second electronic device 130 is described with reference to FIG. 4.

Figure 4:
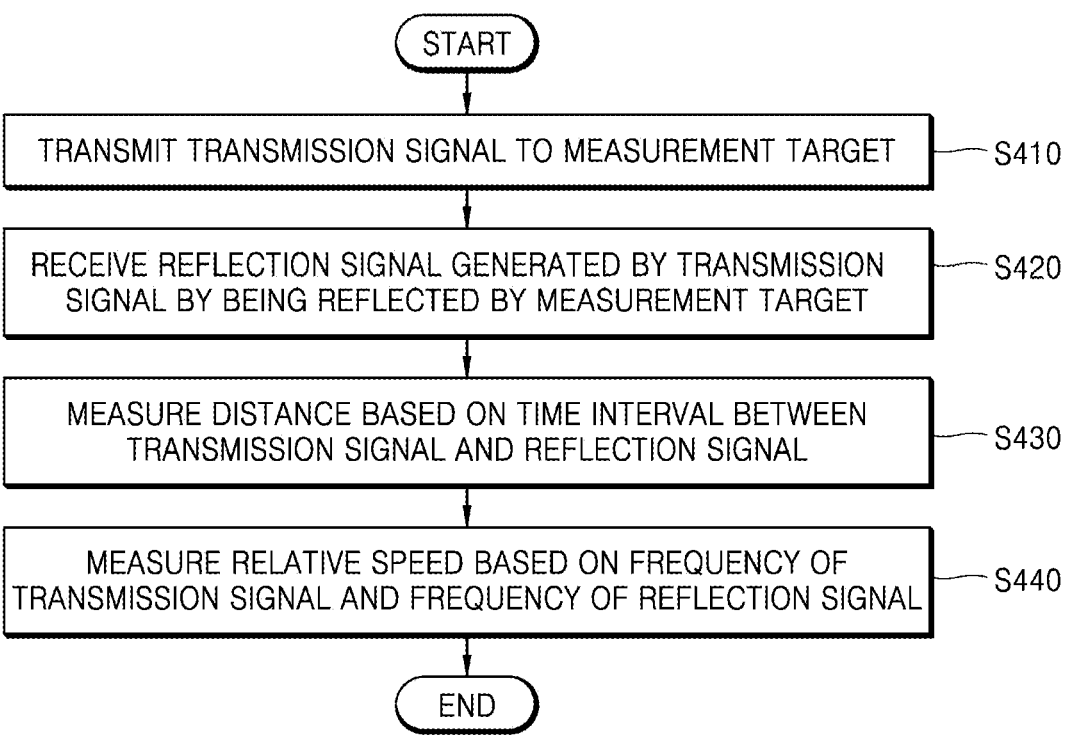
FIG. 4 is a flowchart of an operating method of an electronic device communicating with a server, according to some example embodiments.

FIG. 4 is a flowchart of an operating method of an electronic device communicating with the server 140, according to some example embodiments.

Referring to FIG. 4, in operation S410, an electronic device may transmit a transmission signal to the measurement target 110. In some example embodiments, the first electronic device 120 may transmit the first transmission signal to the measurement target 110, and the second electronic device 130 may transmit the second transmission signal to the measurement target 110.

In operation S420, an electronic device may receive a reflection signal generated by reflecting a transmission signal by the measurement target 110. In some example embodiments, the first electronic device 120 may receive the first reflection signal generated by reflecting the first transmission signal by the measurement target 110, and the second electronic device 130 may receive the second reflection signal generated by reflecting the second transmission signal by the measurement target 110.

In operation S430, an electronic device may measure a distance, based on a time interval between the transmission signal and the reflection signal.

In some example embodiments, the first electronic device 120 may measure the first distance, based on a time interval between a transmission time point of the first transmission signal and a reception time point of the first reflection signal. The first electronic device 120 may calculate the first distance based on Formula 1 below.

$$R_1 = \frac{\tau_1 \cdot v_c}{2} \qquad \text{[Formula 1]}$$

In Formula 1 and below, $R_1$ may represent the first distance, Ti may represent the time interval between the transmission time point of the first transmission signal and the reception time point of the first reflection signal, and v c may represent the speed of light (which may be stored as a fixed value at a memory of the first electronic device 120 and applied to Formula 1 to determine $R_1$ based on a determined time interval Ti).

In addition, the second electronic device 130 may measure the second distance, based on a time interval between a transmission time point of the second transmission signal and a reception time point of the second reflection signal. The second electronic device 130 may calculate the second distance based on Formula 2 below.

$$R_2 = \frac{\tau_2 \cdot v_c}{2} \qquad \text{[Formula 2]}$$

In Formula 2 and below, $R_2$ may represent the second distance, and $\tau_2$ may represent the time interval between the transmission time point of the second transmission signal and the reception time point of the second reflection signal, and v c may represent the speed of light (which may be stored as a fixed value at a memory of the second electronic device 130 and applied to Formula 2 to determine $R_2$ based on a determined time interval $\tau_2$).

In operation S440, an electronic device may measure the relative speed, based on the frequency of the transmission signal and the frequency of the reflection signal.

In some example embodiments, the first electronic device 120 may measure the first relative speed, based on the frequency of the first transmission signal and the frequency of the first reflection signal. The first electronic device 120 may calculate the first relative speed based on Formula 3 below.

$$v_{r1} = \frac{f_{d1} \cdot v_c}{2f_{c1}} \qquad \text{[Formula 3]}$$

In Formula 3 and below, $v_{r1}$ may represent the first relative speed, fa may represent a carrier frequency of the first transmission signal (which may be stored as a fixed value at a memory of the first electronic device 120 and accessed thereby to be applied to Formula 3), and fai may represent the Doppler variation frequency of the first reflection signal (which may be stored as a fixed value at a memory of the first electronic device 120 and accessed thereby to be applied to Formula 3).

In addition, the second electronic device 130 may measure the second relative speed, based on the frequency of the second transmission signal and the frequency of the second reflection signal. The second electronic device 130 may calculate the second relative speed based on Formula 4 below.

$$v_{r2} = \frac{f_{d2} \cdot v_c}{2f_{c2}} \qquad \text{[Formula 4]}$$

In Formula 4 and below, $v_{r2}$ may represent the second relative speed, G 2 may represent a carrier frequency of the second transmission signal (which may be stored as a fixed value at a memory of the second electronic device 130 and accessed thereby to be applied to Formula 4), and $f_{d2}$ may represent the Doppler variation frequency of the second reflection signal (which may be stored as a fixed value at a memory of the second electronic device 130 and accessed thereby to be applied to Formula 4).

Referring to FIG. 3 again, in operation S320, the communication circuit 141 may receive the first measurement information from the first electronic device 120 in response to the measurement request. In addition, in operation S330, the communication circuit 141 may receive the second measurement information from the second electronic device 130 in response to the measurement request. FIG. 3 illustrates some example embodiments in which the first measurement information is received first, and the second measurement information is received later, but some example embodiments are not limited thereto. In other words, in some example embodiments, unlike the example embodiments as illustrated in FIG. 3, the second measurement information may be received first, the first measurement information may be received later, and the first measurement information and the second measurement information may be received simultaneously in some example embodiments.

In operation S340, the processor 142 may calculate the position (e.g., absolute geographic position and/or coordinates, relative position in relation to one or more electronic devices 120 and/or 130, etc.) of the measurement target 110, based on the first measurement information and the second measurement information. A more detailed method of calculating the position of the measurement target 110 by the processor 142 may be described in more detail with reference to FIG. 5.

Figure 5:
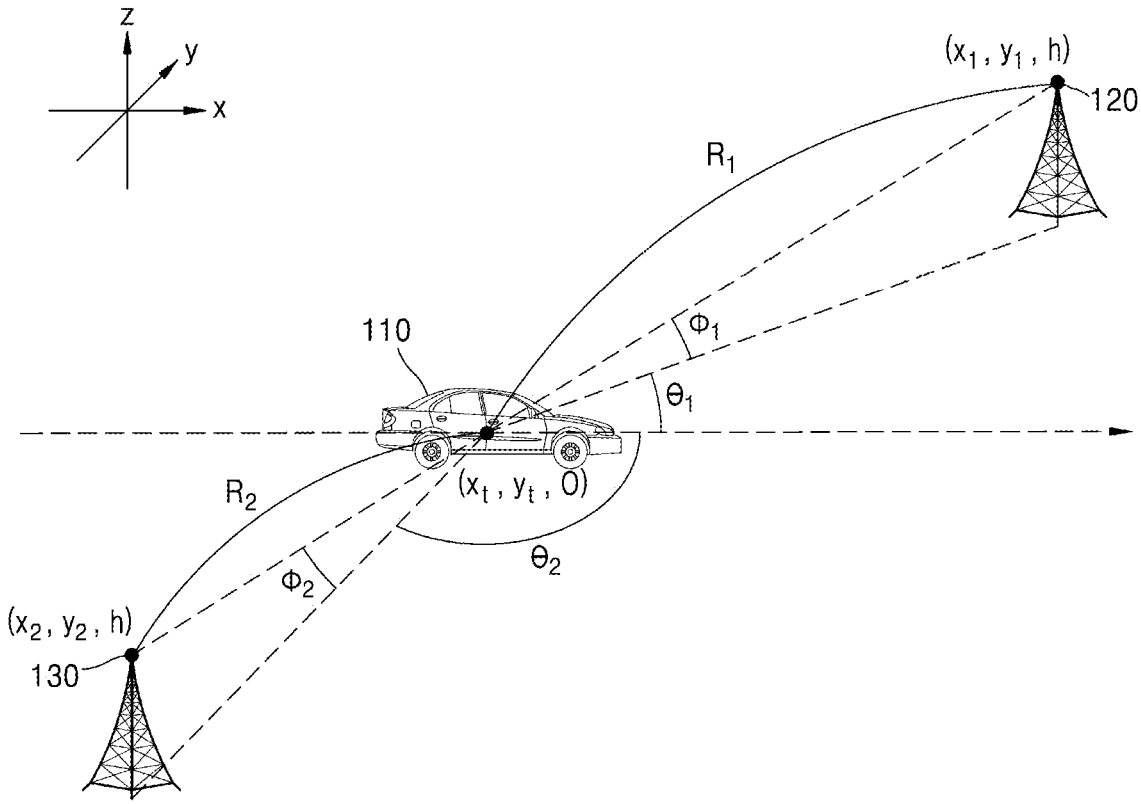
FIG. 5 is a diagram describing a method of calculating a position of a measurement target by a server, according to some example embodiments.

FIG. 5 is a diagram describing a method of calculating the position of the measurement target 110 by the server 140, according to some example embodiments.

Referring to FIG. 5, a diagram illustrating a positional relationship between the measurement target 110, the first electronic device 120, and the second electronic device 130 may be identified. In some example embodiments, it is assumed that the measurement target 110 moves at an absolute speed v in an x axis, the first electronic device 120 is at the top of the first roadside base station, and the second electronic device 130 is at the top of the second roadside base station.

The position of the measurement target 110, the position of the first electronic device 120, and the position of the second electronic device 130 may be expressed as coordinates. The position of the measurement target 110 may be expressed as $(x_t, y_t, 0)$, the position of the first electronic device 120 may be expressed as $(x_1, y_1, h)$, and the position of the second electronic device 130 may be expressed as $(x_2, y_2, h)$. The values of $x_1$, $y_1$, $x_2$, $y_2$, and/or h (and thus the positions of the first and/or second electronic devices 120 and/or 130) may be stored as fixed, respective values (e.g., fixed geographic coordinate and/or height values) at a memory of one or more of the server 140, the first electronic device 120, and/or the second electronic device 130 and may be accessed to perform the calculation of the position of the measurement target at operation S340 (e.g., based on processor 142 accessing said values from memory 143 as part of operation S340).

The first distance, that is a distance between the measurement target 110 and the first electronic device 120, may be $R_1$ as measured above. The second distance, that is a distance between the measurement target 110 and the second electronic device 130, may be $R_2$ as measured above.

In some example embodiments, the distance between the measurement target 110 and the first electronic device 120 may be expressed by Formula 5.

$$(x_1-x_t)^2+(y_1-y_t)^2+h^2=R_1^2 \qquad \text{[Formula 5]}$$

In addition, the distance between the measurement target 110 and the second electronic device 130 may be expressed by Formula 6.

$$(x_2-x_t)^2+(y_2-y_t)^2+h^2=R_2^2 \qquad \text{[Formula 6]}$$

The first relative speed, which is the relative speed of the first electronic device 120 with respect to the measurement target 110, may be $v_{r1}$ as measured above. In addition, the second relative speed, that is the relative speed of the second electronic device 130 with respect to the measurement target 110, may be $v_{r2}$ as measured above.

In some example embodiments, the relationship between the absolute speed of the measurement target 110 and the first relative speed may be expressed by Formula 7 below.

$$v_{r1}=v \cos(\theta_1)\cos(\phi_1) \qquad \text{[Formula 7]}$$

In the Formula 7 and below, v may represent the absolute speed of the measurement target 110, $\theta_1$ may represent an angle between a straight line connecting a lower end of the first roadside base station, where the first electronic device 120 is arranged, to the measurement target 110, and a straight line representing a direction, in which the measurement target 110 is moving, and $\theta_1$ may represent an angle between a straight line connecting the upper end of the first roadside base station to the measurement target 110 and a straight line connecting the lower end of the first roadside base station to the measurement target 110.

The relationship between the absolute speed of the measurement target 110 and the second relative speed may be expressed by Formula 8 below.

$$v_{r2}=v\,\cos(\theta_2)\cos(\phi_2) \qquad \text{[Formula 8]}$$

In the Formula 8 and below, $\phi_2$ may represent an angle between a straight line connecting a lower end of the second roadside base station, where the second electronic device 130 is arranged, to the measurement target 110, and a straight line representing a direction, in which the measurement target 110 is moving, and $\phi_2$ may represent an angle between a straight line connecting the upper end of the second roadside base station to the measurement target 110 and a straight line connecting the lower end of the second roadside base station to the measurement target 110.

In some example embodiments, a cosine portion of Formula 7 may be expressed as Formula 9 below by using the position of the measurement target 110, the position of the first electronic device 120, and Formula 5.

$$\cos(\theta_1)\,\cos(\phi_1) = \frac{x_1 - x_t}{\sqrt{(x_1 - x_t)^2 + (y_1 - y_t)^2 + h^2}} = \frac{x_1 - x_t}{R_1} \qquad \text{[Formula 9]}$$

In addition, a cosine portion of Formula 8 may be expressed as Formula 10 below by using the position of the measurement target 110, the position of the second electronic device 130, and Formula 6.

$$\cos(\theta_2)\,\cos(\phi_2) = \frac{x_2 - x_t}{\sqrt{(x_2 - x_t)^2 + (y_2 - y_t)^2 + h^2}} = \frac{x_2 - x_t}{R_2} \qquad \text{[Formula 10]}$$

In some example embodiments, Formula 11 may be obtained by subtracting Formula 6 from Formula 5.

$$2(x_1-x_2)\cdot x_t+2(y_1-y_2)\cdot y_t=R_2{}^2-R_1{}^2+x_1{}^2-x_2{}^2+y_1{}^2-y_2{}^2 \qquad \text{[Formula 11]}$$

In addition, when Formula 9 is substituted into Formula 7 to summarize for v, and Formula 10 is substituted into Formula 8 to summarize for v, Formula 12 and Formula 13 below may be obtained.

$$v = \frac{v_{r1}\cdot R_1}{x_1 - x_t} \qquad \text{[Formula 12]}$$

$$v = \frac{v_{r2}\cdot R_2}{x_2 - x_t} \qquad \text{[Formula 13]}$$

Finally, by summarizing Formula 11, Formula 12, and Formula 13 for $x_t$ and $y_t$, the position of the measurement target 110 may be obtained as expressed in Formula 14 below.

$$\begin{pmatrix} x_t \\ y_t \end{pmatrix} = \qquad \text{[Formula 14]}$$

-continued $$\left( \begin{array}{c} \dfrac{v_{r1}\cdot R_1\cdot x_2 - v_{r2}\cdot R_2\cdot x_1}{v_{r1}\cdot R_1 - v_{r2}\cdot R_2} \\[2ex] \dfrac{R_2^2 - R_1^2 + x_1^2 - x_2^2 + y_1^2 - y_2^2}{2(y_1 - y_2)} - \dfrac{x_1 - x_2}{y_1 - y_2}\cdot\dfrac{v_{r1}\cdot R_1\cdot x_2 - v_{r2}\cdot R_2\cdot x_1}{v_{r1}\cdot R_1 - v_{r2}\cdot R_2} \end{array} \right)$$

By using Formula 14, the processor 142 may calculate the position of the measurement target 110, based on the position of the first electronic device 120, the position of the second electronic device 130, the first measurement information, and the second measurement information. In other words, the processor 142 may calculate the position of the measurement target 110, based on the relational expression among the position of the first electronic device 120, the position of the second electronic device 130, the first distance, the first relative speed, and the position of the measurement target 110 (e.g., the relational expression represented by one or more of Formulas 1 to 14).

In some example embodiments, the position of the first electronic device 120 and the position of the second electronic device 130 (e.g., the values of $x_1$, $y_1$, $x_2$, $y_2$, and/or $h$) may be preset when the first roadside base station and the second roadside base station are installed. Accordingly, the position of the first electronic device 120 and the position of the second electronic device 130 may be stored (e.g., as fixed values of $x_1$, $y_1$, $x_2$, $y_2$, and/or $h$) in advance in the memory 143 in the server 140 and which may be accessed by the processor 142 to implement the calculation of the position of the measurement target via application of said fixed values to any of Formulas 1 to 14 together with first and/or second measurement information).

Referring back to FIG. 3 again, in operation S350, the processor 142 may calculate the absolute speed of the measurement target 110, based on the first measurement information, the second measurement information, and the position of the measurement target 110.

Because the position of the measurement target 110 has been calculated, the processor 142 may calculate the absolute speed of the measurement target 110 by using Formula 12 or Formula 13. A more detailed method of calculating the absolute speed of the measurement target 110 by the processor 142 is described below with reference to FIGS. 6 through 8.

Because the server 140 according to the inventive concepts can calculate the position and absolute speed of the measurement target 110 by using the result measured by using the first electronic device 120 and the second electronic device 130 as described above, the server 140 may calculate more accurately the position and speed of the measurement target 110, communicate with a smaller number (e.g., quantity) of roadside base stations, and calculate the position and speed of the measurement target 110. Accordingly, the position and speed of the measurement target may be calculated with greater efficiency and conversation of computing resourced and thus power consumption (e.g., fewer resources, communication with and operation of fewer electronic devices of fewer roadside base stations) and further with greater speed, which may further facilitate faster communication of driving information to one or more vehicles (e.g., measurement targets) to enable faster, more responsive adjustments to the navigation and/or driving of the one or more vehicles through the external environment (e.g., along a road).

FIG. 6 is a flowchart of an example of a method of calculating the absolute speed of the measurement target 110 by the server 140, according to some example embodiments.

Referring to FIG. 6, in operation S610, the processor 142 may determine whether it is possible to calculate the absolute speed of the measurement target 110, based on the position of the first electronic device 120 and the position of the measurement target 110. In other words, the processor 142 may determine whether it is possible to calculate the absolute speed of the measurement target 110 based on Formula 12. In some example embodiments, the processor 142 may determine that it is impossible to calculate the absolute speed of the measurement target 110, based on the position of the first electronic device 120 and the position of the measurement target 110.

Figure 7:
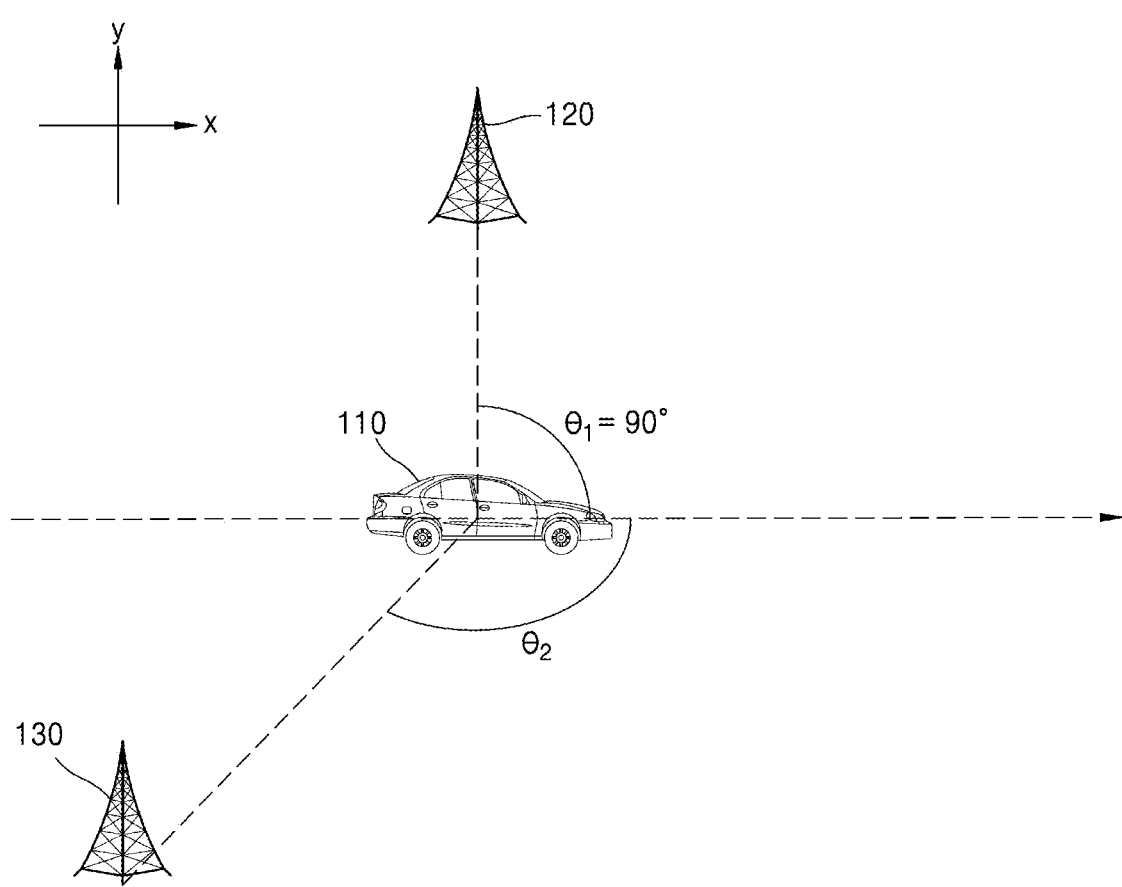
FIG. 7 is a diagram describing a method of calculating an absolute speed of a measurement target by a server, according to some example embodiments.

FIG. 7 is a diagram describing a method of calculating the absolute speed of the measurement target 110 by the server 140, according to some example embodiments.

Referring to FIG. 7, a diagram illustrating a positional relationship between the measurement target 110, the first electronic device 120, and the second electronic device 130 may be identified.

In some example embodiments of FIG. 7, an angle, $\theta_1$, between a straight line connecting the first electronic device 120 to the measurement target 110 and a straight line indicating a direction, in which the measurement target 110 moves, may be about 90°. In this case, the x-coordinate value $x_t$ of the position of the measurement target 110 may be the same as the x-coordinate $x_1$ of the position of the first electronic device 120. In this case, because the denominator on the right side of Formula 12 becomes zero, the processor 142 may determine that it is impossible to calculate the absolute speed of the measurement target 110 based on Formula 12. In other words, when $\theta_1$ is about 90°, the processor 142 may determine that it is impossible to calculate the absolute speed of the measurement target 110, based on the position of the first electronic device 120 and the position of the measurement target 110.

In addition, even when $\theta_1$ is not about 90°, but is not significantly different from about 90°, and when the processor 142 calculates the absolute speed of the measurement target 110 based on Formula 12, the error of the absolute speed may increase. Accordingly, even when $\theta_1$ is different from 90° by an angle equal to or less than a preset (e.g., threshold) reference error angle (e.g., based on a determination that $\theta_1$ is different from 90° by an angle equal to or less than a threshold reference error angle of 1°), the processor 142 may determine that it is impossible to calculate the absolute speed of the measurement target 110, based on the position of the first electronic device 120 and the position of the measurement target 110.

Referring back to FIG. 6 again, when it is determined (e.g., in response to a determination) that it is possible to calculate the absolute speed of the measurement target 110, based on the position of the first electronic device 120 and the position of the measurement target 110, in operation S620, the processor 142 may calculate the absolute speed of the measurement target 110, based on the position of the first electronic device 120 and the position of the measurement target 110. In other words, when it is determined that it is possible to calculate the absolute speed of the measurement target 110, based on the position of the first electronic device 120 and the position of the measurement target 110, the absolute speed of the measurement target 110 may be calculated based on the Formula 12.

When it is determined that it is impossible to calculate the absolute speed of the measurement target 110, based on the position of the first electronic device 120 and the position of the measurement target 110, in operation S630, the processor 142 may calculate the absolute speed of the measurement target 110, based on the second relative speed, the position of the second electronic device 130, and the position of the measurement target 110. In other words, when it is determined that it is impossible to calculate the absolute speed of the measurement target 110, based on the position of the first electronic device 120 and the position of the measurement target 110, the absolute speed of the measurement target 110 may be calculated based on the Formula 13.

Figure 8:
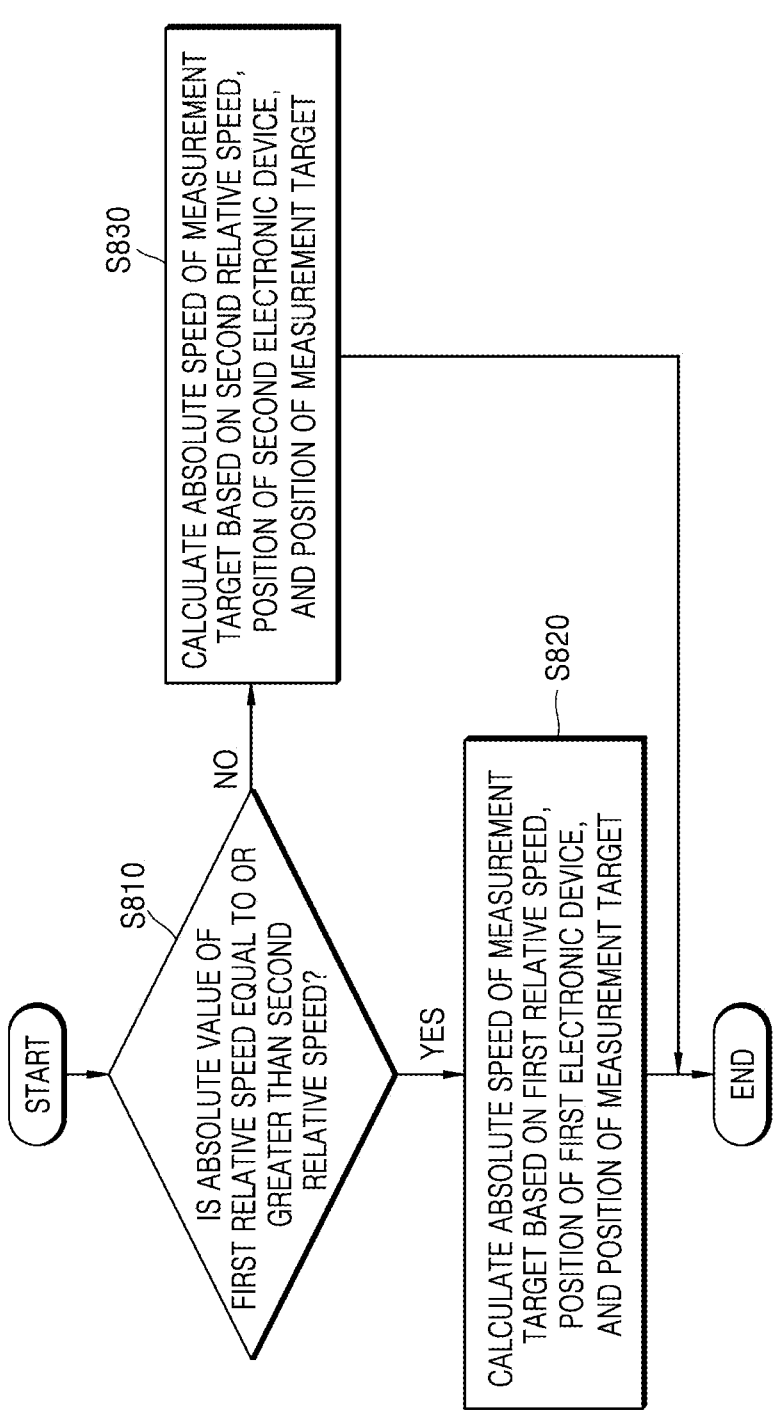
FIG. 8 is a flowchart of another example of a method of calculating an absolute speed of a measurement target by a server, according to some example embodiments.

FIG. 8 is a flowchart of another example of a method of calculating the absolute speed of the measurement target 110 by the server 140, according to some example embodiments.

Referring to FIG. 8, in operation S810, the processor 142 may determine whether the absolute value of the first relative speed is equal to or greater than the absolute value of the second relative speed. This is because when the processor 142 calculates the absolute speed of the measurement target 110 by using a smaller value of the absolute value of the first relative speed and the absolute value of the second relative speed, the calculation result may be inaccurate. Conversely, when the processor 142 calculates the absolute speed of the measurement target 110 by using a larger value of the absolute value of the first relative speed and the absolute value of the second relative speed, the accuracy of the calculated absolute speed of the measurement target 110 may be improved.

When it is determined that the absolute value of the first relative speed is equal to or greater than the absolute value of the second relative speed, in operation S820, the processor 142 may calculate the absolute speed of the measurement target 110, based on the first relative speed, the position of the first electronic device 120, and the position of the measurement target 110. In other words, when it is determined that the absolute value of the first relative speed is equal to or greater than the absolute value of the second relative speed, the processor 142 may calculate the absolute speed of the measurement target 110 based on Formula 12.

When it is determined that the absolute value of the first relative speed is equal to or less than the absolute value of the second relative speed, in operation S830, the processor 142 may calculate the absolute speed of the measurement target 110, based on the second relative speed, the position of the second electronic device 130, and the position of the measurement target 110. In other words, when it is determined that the absolute value of the first relative speed is equal to or less than the absolute value of the second relative speed, the processor 142 may calculate the absolute speed of the measurement target 110 based on Formula 13.

Referring back to FIG. 3, in operation S360, driving information is provided (e.g., transmitted, for example via V2I communication) to one or more vehicles based on the calculated position and/or absolute speed of the measurement target 110, to cause the one or more vehicles (e.g., ADAS's included therein and/or implemented thereby) to adjust navigation (e.g., driving, such as autonomous driving) of the one or more vehicles through an environment (e.g., external environment, such as along a road). The driving information may simply include (e.g., indicate) the calculated position and/or the calculated absolute speed of the measurement target 110 (e.g., as calculated at operations S340 and/or S350).

The one or more vehicles to which the driving information is provided may include the measurement target 110 alone, may include the measurement target 110 together with one or more other, separate measurement targets, vehicles, may exclude the measurement target 110, or the like. A vehicle (e.g., an ADAS thereof) may implement control of one or more driving control elements of the vehicle based on received driving information to adjust navigation of the vehicle through an environment, including adjusting a speed of the vehicle in autonomous driving, a spacing of the vehicle with one or more adjacent vehicles and/or other objects in the external environment, or the like. As a result, navigation (e.g., driving) of one or more vehicles through an environment may be caused to be adjusted based on the calculation of position and/or absolute speed of a measurement target 110 at server 140 based on the first and second measurement information generated by the separate first and second electronic devices 120 and 130 which are received and processed at the server 140 to perform such calculation(s) and provide associated driving information to the one or more vehicles.

The calculations of position and/or absolute speed of a measurement target 110 as performed according to any of the example embodiments may be performed with improved accuracy, speed, efficiency, and/or reduced computing resources and/or power consumption based on utilizing the first and second measurement information generated by the separate first and second electronic devices 120 and 130 which are received and processed at a server 140 to perform such calculation(s) and provide associated driving information based on such calculations to one or more vehicles, thereby enabling adjustment to the navigation (e.g., autonomous driving) of the one or more vehicles to which the resulting driving information is provided with improved accuracy, speed, efficiency, and/or reduced computing resources and/or power consumption, thus improving driving (e.g., autonomous driving) performance of such vehicles and/or improving efficiency (e.g., computing and/or power consumption efficiency) of a system that includes at least the server and electronic devices to enable such performance.

Figure 9:
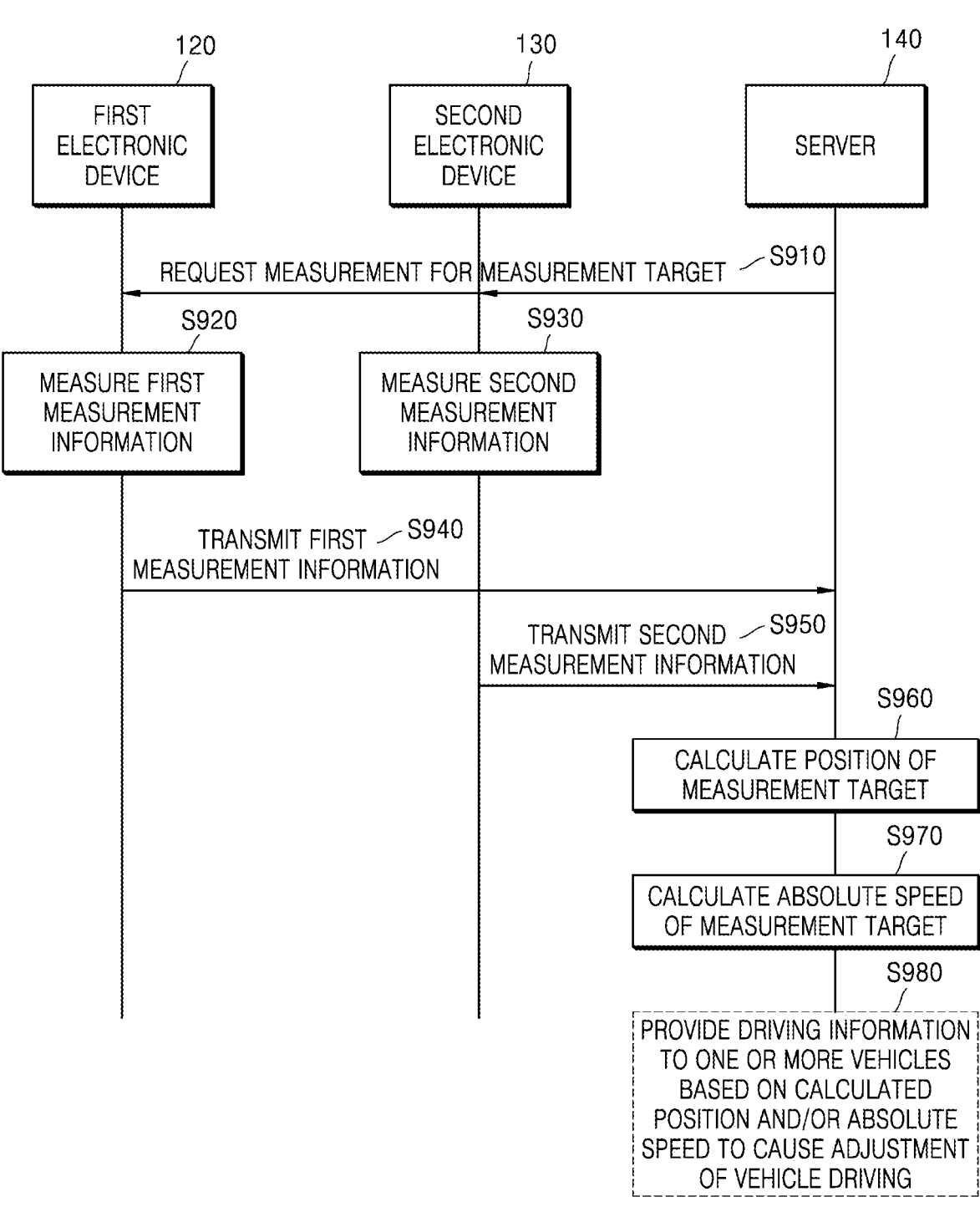
FIG. 9 is a flowchart of an operation method of a system, according to some example embodiments.

FIG. 9 is a flowchart of an operation method of the system 100, according to some example embodiments.

Referring to FIG. 9, in operation S910, the server 140 may transmit a measurement request for the measurement target 110 to the first electronic device 120 and the second electronic device 130. The server 140 may transmit a measurement request simultaneously or sequentially to the first electronic device 120 and the second electronic device 130.

In operation S920, the first electronic device 120 may measure the first measurement information. The first electronic device 120 may measure the first measurement information, by measuring the first distance and the first relative speed, based on the first transmission signal and the first reflection signal.

In operation S930, the second electronic device 130 may measure the second measurement information. The second electronic device 130 may measure the second measurement information, by measuring the second distance and the second relative speed, based on the second transmission signal and the second reflection signal. In some example embodiments, operation S920 and operation S930 may be performed at the same time.

In operation S940, the first electronic device 120 may transmit the first measurement information to the server 140. In addition, in operation S950, the second electronic device 130 may transmit the second measurement information to the server 140. FIG. 9 illustrates some example embodiments in which the first electronic device 120 first transmits the first measurement information to the server 140, and then the second electronic device 130 transmits the second measurement information to the server 140, but some example embodiments are not limited thereto. In other words, in some example embodiments, and unlike some example embodiments such as the example embodiments shown in FIG. 9, the second electronic device 130 may first transmit the second measurement information to the server 140, and then the first electronic device 120 may transmit the first measurement information to the server 140, and the first electronic device 120 and the second electronic device 130 may transmit the first measurement information and the second measurement information to the server 140, respectively, as soon as the measurement is completed.

In operation S960, the server 140 may calculate the position of the measurement target 110 based on the first measurement information and the second measurement information. The server 140 may calculate the position of the measurement target 110, based on the relational expression, such as Formula 14, among the position of the first electronic device 120, the position of the second electronic device 130, the first distance, the first relative speed, and the position of the measurement target 110.

In operation S970, the server 140 may calculate the absolute speed of the measurement target 110 based on the position of the measurement target 110. The server 140 may calculate the absolute speed of the measurement target 110 by using Formula 12 or Formula 13, depending on whether the absolute speed of the measurement target 110 can be calculated, based on the position of the first electronic device 120 and the position of the measurement target 110.

In operation S980, the server 140 may provide (e.g., transmit) driving information is provided to one or more vehicles (e.g., via V2I communication) based on the calculated position and/or absolute speed of the measurement target 110, to cause the one or more vehicles (e.g., ADAS's included therein and/or implemented thereby) to adjust navigation (e.g., driving) of the one or more vehicles through an environment (e.g., along a road).

Figure 10:
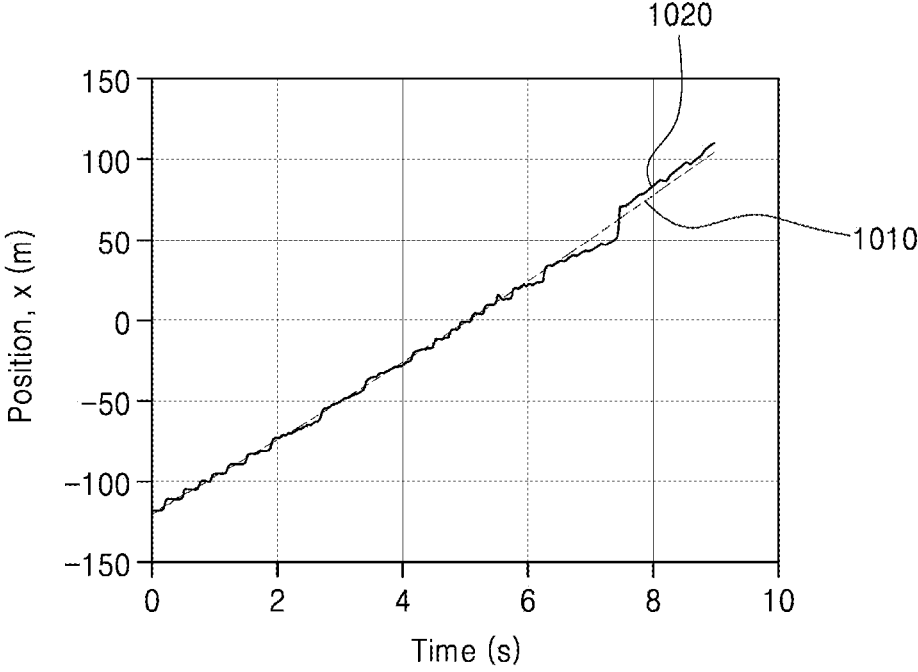
FIG. 10 is a graph comparing a position of a measurement target calculated by using a system, with an actual position of the measurement target, according to some example embodiments.

FIG. 10 is a graph comparing the position of the measurement target 110 calculated by using the system 100 with an actual position of the measurement target 110, according to some example embodiments.

Referring to FIG. 10, a dash-dot line 1010 illustrating the actual position of the measurement target 110, and a solid line 1020 illustrating the position of the measurement target 110 measured by using the system 100 according to some example embodiments may be identified. In the graph of FIG. 10, the x-axis may represent time, and the y-axis may represent the position of the measurement target 110 based on the x-coordinate.

As may be understood from the graph of FIG. 10, it may be identified that the position of the measurement target 110 measured by the system 100 according to some example embodiments is not significantly different from the actual position of the measurement target 110.

In some example embodiments, a root-mean-squared error (RMSE) between the position of the measurement target 110 measured by the system 100 according to some example embodiments and the actual position of the measurement target 110 may be about 0.0763 m, which is a small value.

Because the server 140 can calculate the position and absolute speed of the measurement target 110, by using the result measured by using the first electronic device 120 and the second electronic device 130 as described above (e.g., using only two of the roadside base stations, such as only the two roadside base stations that are closest to the measurement target 110), the system 100 according to the inventive concepts may calculate more accurately the position and speed of the measurement target 110, communicate with a less number of roadside base stations (e.g., utilizing reduced computing resources, and thus operating with reduced power consumption), and calculate the position and speed of the measurement target 110, thereby improving performance and/or efficiency of the system 100 including same and further enabling improved navigation (e.g., autonomous driving) by one or more vehicles based on driving information provided by the server 140 thereto, where such driving information may include and/or be based upon the calculated position and/or speed of the measurement target 110.

FIG. 11 is a block diagram of an electronic device according to some example embodiments. Said electronic device may include and/or implement any of the systems, electronic devices, base stations, vehicles, servers, electronic devices, modules, units, controllers, circuits, or any portion thereof included in any of the example embodiments, including any portion of the system 1, the measurement targets 11 and 12, roadside base stations 21, 22, 23, and 24, the server 30, the system 100, the measurement target 110, the first electronic device 120, the second electronic device 130, the server 140, the communication circuit 141, the processor 142, the memory 143, any combination thereof, or the like.

Referring to FIG. 11, an electronic device 2000 may include a processor 2020, a memory 2030, and an interface 2040 that are electrically coupled together via a bus 2010. The electronic device 2000 may include one or more additional devices 2050 that may be coupled to the bus 2010. The interface 2040 may be a communication interface (e.g., a wired or wireless communication transceiver).

The one or more additional devices 2050 may include a radar (e.g., OFDM radar), a signal transmitter, a signal receiver, a signal transceiver. In some example embodiments, where the electronic device 2000 is included in a vehicle, measurement target, an ADAS in a vehicle, or the like, the one or more additional devices 2050 may include one or more driving control elements (e.g., throttle control elements, steering control elements, braking control elements), or the like that may be controlled to control navigation (e.g., driving) of a vehicle through an external environment (e.g., along a road).

The memory 2030, which may be a non-transitory computer readable medium, may store a program of instructions and/or other information. The memory 2030 may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM). The processor 2020 may execute the stored program of instructions to perform one or more functions, where such functions may include implementing any of the operations of any of the example embodiments and/or any of the functionality of any of the systems, electronic devices, base stations, vehicles, servers, electronic devices, modules, units, controllers, circuits, or any portion thereof included in any of the example embodiments.

One or more of the processor 2020, memory 2030, interface 2040, and/or additional device(s) 2050 may be included in, include, and/or implement one or more instances of processing circuitry such as hardware including logic circuits, a hardware/software combination such as a processor executing software; or a combination thereof. In some example embodiments, said one or more instances of processing circuitry may include, but are not limited to, a central processing unit (CPU), an application processor (AP), an arithmetic logic unit (ALU), a graphic processing unit (GPU), a digital signal processor, a microcomputer, a field programmable gate array (FPGA), a System-on-Chip (SoC) a programmable logic unit, a microprocessor, or an application-specific integrated circuit (ASIC), etc. In some example embodiments, any of the systems, electronic devices, base stations, vehicles, servers, electronic devices, modules, units, controllers, circuits, or any portion thereof included in any of the example embodiments as described herein may include a non-transitory computer readable storage device, for example a solid state drive (SSD), storing a program of instructions, and the one or more instances of processing circuitry may be configured to execute the program of instructions to implement the functionality of some or all of any of the processor 2020, memory 2030, interface 2040, additional device(s) 2050, or the like according to any of the example embodiments as described herein. It will be further understood that the processing circuitry may be configured to perform any of the methods, operations, functionality, or the like as described herein, for example based on including include a non-transitory computer readable storage device, for example a solid state drive (SSD), storing a program of instructions, and a processor (e.g., CPU) configured to execute the program of instructions to implement any or all of the operations of any of the methods according to any of the example embodiments, including without limitation any or all of the operations of any or all of the methods shown in FIG. 3, FIG. 4, FIG. 6, FIG. 8, FIG. 9, any combination thereof, or the like.

While the inventive concepts have been particularly shown and described with reference to some example embodiments thereof, it will be understood that various changes in form and details may be made therein without departing from the spirit and scope of the following claims.

What is claimed is:

1. An operating method of a server to calculate a position of a measurement target, the operating method comprising:

receiving measurement information from a plurality of roadside base stations, the plurality of roadside base stations including at least three roadside base stations, the measurement information indicating respective distances between each of the at least three roadside base stations and the measurement target, the measurement information including first measurement information including a result of measuring the measurement target by a first electronic device, the first electronic device at a first roadside base station of the at least three roadside base stations, and second measurement information including a result of measuring the measurement target by a second electronic device, the second electronic device at a second roadside base station of the at least three roadside base stations;

calculating the position of the measurement target based on the first measurement information, the second measurement information, a position of the first electronic device, and a position of the second electronic device, the calculating based on a determination that the first roadside base station and the second roadside base station are a closest two roadside base stations to the measurement target among the plurality of roadside base stations, based on the measurement information received from the plurality of roadside base stations; and transmitting driving information to one or more vehicles based on the calculated position of the measurement target to cause the one or more vehicles to adjust navigation of the one or more vehicles.

2. The operating method of claim 1, wherein the first measurement information comprises
a first distance, which is a distance between the first electronic device and the measurement target, and
a first relative speed, which is a relative speed of the measurement target with respect to the first electronic device, and
the second measurement information comprises
a second distance, which is a distance between the second electronic device and the measurement target, and
a second relative speed, which is a relative speed of the measurement target with respect to the second electronic device.

3. The operating method of claim 2, wherein
the first distance is measured based on a time interval between a first transmission signal transmitted by the first electronic device and a first reflection signal generated by the first transmission signal reflected by the measurement target, and
the second distance is measured based on a time interval between a second transmission signal transmitted by the second electronic device and a second reflection signal generated by the second transmission signal reflected by the measurement target.

4. The operating method of claim 3, wherein
the first relative speed is measured based on a frequency of the first transmission signal and a frequency of the first reflection signal, and
the second relative speed is measured based on a frequency of the second transmission signal and a frequency of the second reflection signal.

5. The operating method of claim 2, wherein the calculating of the position of the measurement target comprises calculating the position of the measurement target based on a relational expression among the position of the first electronic device, the position of the second electronic device, the first distance, the second distance, the first relative speed, the second relative speed, and the position of the measurement target.

6. The operating method of claim 2, further comprising calculating an absolute speed of the measurement target based on the position of the measurement target and at least one of the first relative speed or the second relative speed.

7. The operating method of claim 6, wherein the calculating of the absolute speed of the measurement target comprises:
determining whether it is possible to calculate the absolute speed of the measurement target based on the position of the first electronic device and the position of the measurement target;
in response to a determination that it is possible to calculate the absolute speed of the measurement target based on the position of the first electronic device and the position of the measurement target, calculating the absolute speed of the measurement target based on the first relative speed, the position of the first electronic device, and the position of the measurement target; and
in response to a determination that it is not possible to calculate the absolute speed of the measurement target based on the position of the first electronic device and the position of the measurement target, calculating the absolute speed of the measurement target based on the second relative speed, the position of the second electronic device, and the position of the measurement target.

8. The operating method of claim 6, wherein the calculating of the absolute speed of the measurement target comprises:
comparing an absolute value of the first relative speed with an absolute value of the second relative speed;
in response to a determination that the absolute value of the first relative speed is equal to or greater than the absolute value of the second relative speed, calculating the absolute speed of the measurement target based on the first relative speed, the position of the first electronic device, and the position of the measurement target; and
in response to a determination that the absolute value of the first relative speed is smaller than the absolute value of the second relative speed, calculating the absolute speed of the measurement target based on the second relative speed, the position of the second electronic device, and the position of the measurement target.

9. A server, comprising:
a communication circuit configured to communicate with a first electronic device and a second electronic device;
a processor configured to execute one or more instructions; and
a memory configured to store the one or more instructions,
wherein the communication circuit is configured to
transmit a measurement request for a measurement target to a plurality of roadside base stations, the plurality of roadside base stations including at least three roadside base stations,
receive measurement information from the plurality of roadside base stations, the measurement information indicating respective distances between each of the at least three roadside base stations and the measurement target, the measurement information including
first measurement information including a result of measuring the measurement target by the first electronic device, the first electronic device at a first roadside base station of the at least three roadside base stations, and
second measurement information including a result of measuring the measurement target by the second electronic device, the second electronic device at a second roadside base station of the at least three roadside base stations,
wherein the processor is configured to execute the one or more instructions to
calculate a position of the measurement target based on the first measurement information, the second measurement information, a position of the first electronic device, and a position of the second electronic device, the calculating based on a determination that the first roadside base station and the second roadside base station are a closest two roadside base stations to the measurement target among the plurality of roadside base stations, based on the measurement information received from the plurality of roadside base stations, and
transmit driving information to one or more vehicles based on the calculated position of the measurement target to cause the one or more vehicles to adjust navigation of the one or more vehicles.

10. The server of claim 9, wherein the first measurement information comprises a first distance, which is a distance between the first electronic device and the measurement target, and a first relative speed, which is a relative speed of the measurement target with respect to the first electronic device, and wherein the second measurement information comprises a second distance, which is a distance between the second electronic device and the measurement target, and a second relative speed, which is a relative speed of the measurement target with respect to the second electronic device.

11. The server of claim 10, wherein the first distance is measured based on a time interval between a first transmission signal transmitted by the first electronic device and a first reflection signal generated by the first transmission signal reflected by the measurement target, and the second distance is measured based on a time interval between a second transmission signal transmitted by the second electronic device and a second reflection signal generated by the second transmission signal reflected by the measurement target.

12. The server of claim 11, wherein the first relative speed is measured based on a frequency of the first transmission signal and a frequency of the first reflection signal, and the second relative speed is measured based on a frequency of the second transmission signal and a frequency of the second reflection signal.

13. The server of claim 10, wherein the processor is configured to execute the one or more instructions to calculate the position of the measurement target based on a relational expression among the position of the first electronic device, the position of the second electronic device, the first distance, the second distance, the first relative speed, the second relative speed, and the position of the measurement target.

14. The server of claim 10, wherein the processor is configured to execute the one or more instructions to calculate an absolute speed of the measurement target based on the position of the measurement target and at least one of the first relative speed or the second relative speed.

15. The server of claim 14, wherein the processor is configured to execute the one or more instructions to determine whether it is possible to calculate the absolute speed of the measurement target based on the position of the first electronic device and the position of the measurement target, in response to a determination that it is possible to calculate the absolute speed of the measurement target based on the position of the first electronic device and the position of the measurement target, calculate the absolute speed of the measurement target, based on the first relative speed, the position of the first electronic device, and the position of the measurement target, and in response to a determination that it is not possible to calculate the absolute speed of the measurement target based on the position of the first electronic device and the position of the measurement target, calculate the absolute speed of the measurement target, based on the second relative speed, the position of the second electronic device, and the position of the measurement target.

16. The server of claim 14, wherein the processor is configured to execute the one or more instructions to compare an absolute value of the first relative speed with an absolute value of the second relative speed, in response to a determination that the absolute value of the first relative speed is equal to or greater than the absolute value of the second relative speed, calculate the absolute speed of the measurement target, based on the first relative speed, the position of the first electronic device, and the position of the measurement target, and in response to a determination that the absolute value of the first relative speed is smaller than the absolute value of the second relative speed, calculate the absolute speed of the measurement target, based on the second relative speed, the position of the second electronic device, and the position of the measurement target.

17. A system for calculating a position of a measurement target, the system comprising:

a first electronic device at a first roadside base station of at least three roadside base stations, the first electronic device configured to measure a first distance, which is a distance between the first electronic device and the measurement target, and a first relative speed, which is a relative speed of the measurement target with respect to the first electronic device, and generate first measurement information including the first distance and the first relative speed;

a second electronic device at a second roadside base station of the at least three roadside base stations, the second electronic device configured to measure a second distance, which is a distance between the second electronic device and the measurement target, and a second relative speed, which is a relative speed of the measurement target with respect to the second electronic device, and generate second measurement information including the second distance and the second relative speed; and a server configured to receive measurement information from a plurality of roadside base stations, the plurality of roadside base stations including the at least three roadside base stations, the measurement information indicating respective distances between each of the at least three roadside base stations and the measurement target, the measurement information including the first measurement information and the second measurement information, calculate the position of the measurement target and an absolute speed of the measurement target based on the first measurement information, the second measurement information, a position of the first electronic device, and a position of the second electronic device, the calculating based on a determination that the first roadside base station and the second roadside base station are a closest two roadside base stations to the measurement target among the plurality of roadside base stations, based on the measurement information received from the plurality of roadside base stations, and transmit driving information to one or more vehicles based on the calculated position of the measurement target to cause the one or more vehicles to adjust navigation of the one or more vehicles.

* * * * *